Dec. 19, 1967 W. H. ANTHONY ETAL 3,359,393
ROTARY DIMMER SWITCH OF THE CANOPY TYPE
Filed Oct. 12, 1965 2 Sheets-Sheet 2
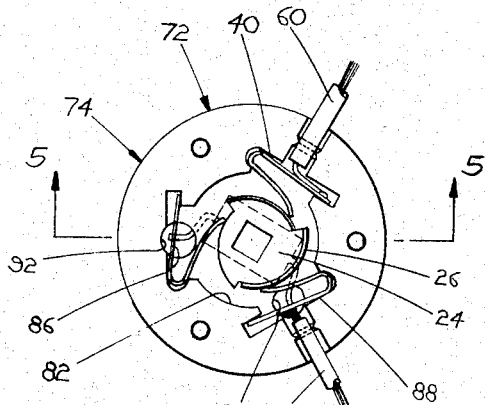
FIG. 4
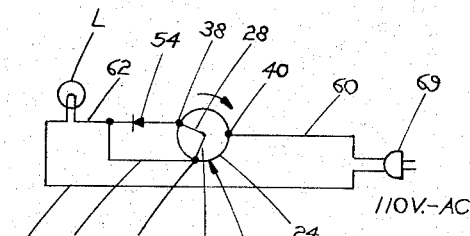
FIG. 9 (OFF)
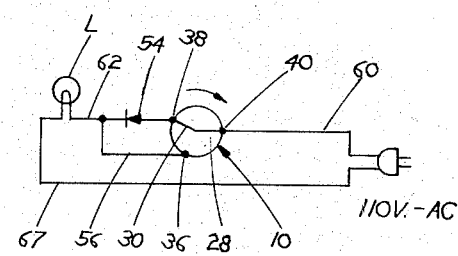
FIG. 10 (LOW)
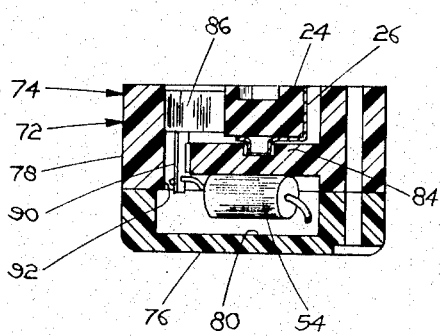
FIG. 5
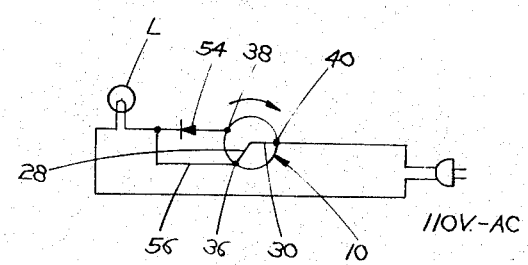
FIG. 11 (HIGH)
INVENTORS:
WALTER H. ANTHONY
FREDERICK A. ZODA
KENNETH H. WALTERICK
Sperry and Zoda
ATTORNEYS 018# United States Patent Office 3,359,393
Patented Dec. 19, 1967

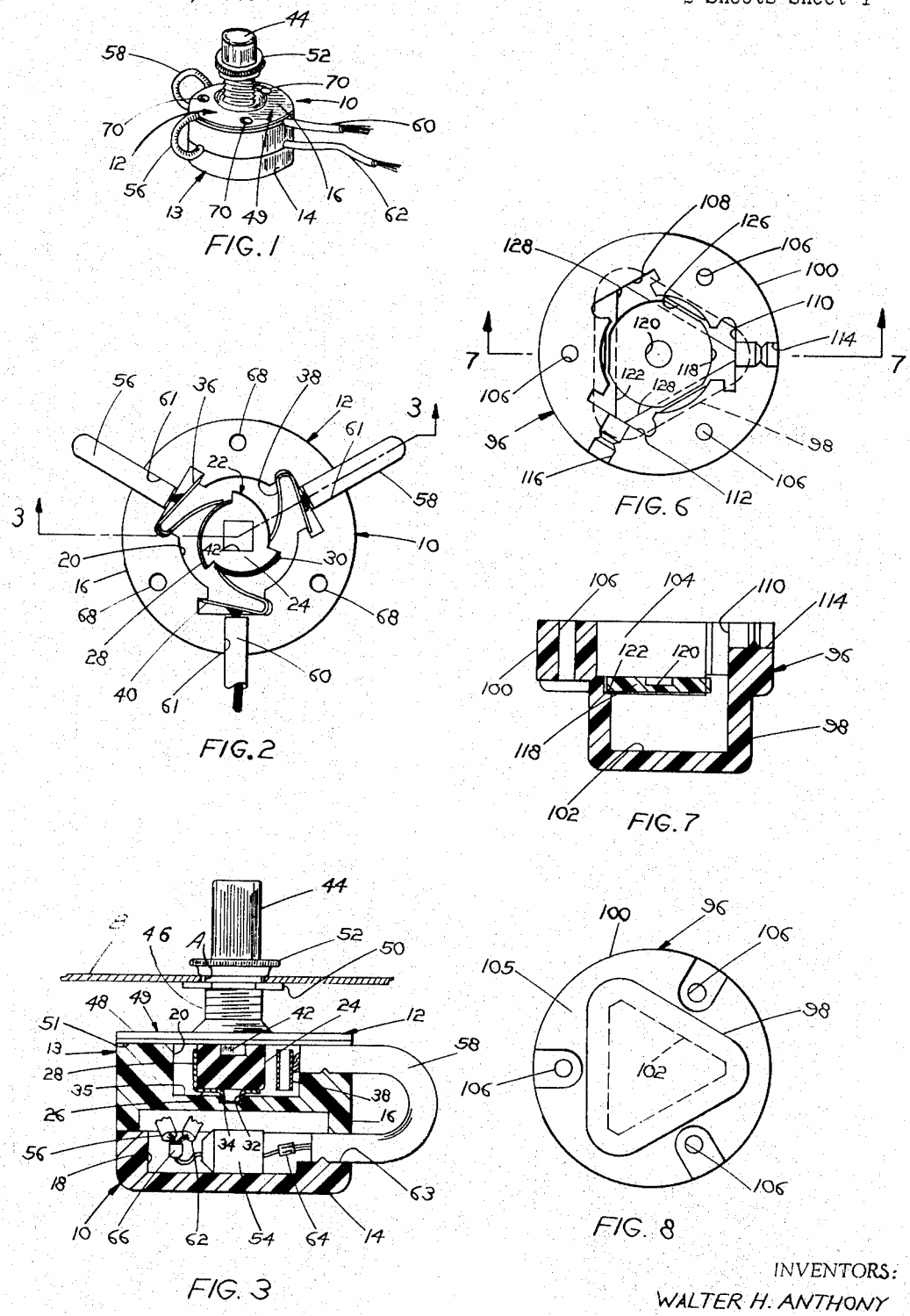

3,359,393
ROTARY DIMMER SWITCH OF THE CANOPY TYPE
Walter H. Anthony, Levittown, Pa., Frederick A. Zoda, Trenton, N.J., and Kenneth H. Walterick, Levittown, Pa., assignors to Circle F Manufacturing Company, Trenton, N.J., a corporation of New Jersey
Filed Oct. 12, 1965, Ser. No. 495,254
3 Claims. (Cl. 200—155)

ABSTRACT OF THE DISCLOSURE

A compact, canopy-type dimmer switch, primarily for use as a component of an electrical fixture to switch one or more single-filament incandescent lamp bulbs of the fixture between high and low illumination levels. The switch is a unitary structure secured in a mounting opening of the fixture in place of a conventional canopy switch. Within a housing comparable closely in size and shape to that of a conventional canopy switch, a solid-state diode is connected with a conventional two-speed rotary switch mechanism to switch the load between off, high, and low conditions.

---

This invention relates generally to electrical switches designed for controlling lamp loads in a manner such as to impart different degrees of brightness to an ordinary, single-filament incandescent lamp. More particularly, the invention relates to a switch coming within this category, designed for mounting directly in either portable or fixed-position lamp fixtures in the same way as, or possibly in direct substitution for, the canopy switches conventionally provided in such fixtures.

A canopy switch is a small, compact switch having widespread application, particularly in the lamp industry. Such switches, by reason of their compactness and the ease and speed with which they can be mounted, are used widely in desk, table, and standing lamps, being readily installable in the bases, standards, or other components thereof. Canopy switches are also widely used in hanging lamp fixtures, being designed specifically for easy installation in the canopies of fixtures of this type.

Further by way of background, it may be observed that switches for dimming ordinary single-filament incandescent lamps have in recent years enjoyed popularity. However, such switches are most usually in the form of wall switches, and are not adaptable for installation in the same environments, the same restricted spaces, and the same mounting openings, as ordinary canopy switches.

It has been proposed to provide for dimming of ordinary single-filament incandescent lamps in pendant and portable lamp fixtures of the type incorporating canopy switches, by providing a half-wave rectifier in circuit with but disposed wholly externally of an ordinary two-circuit canopy switch. This is not a satisfactory solution, however, because the rectifier must itself be mounted in its own casing, with its own wire leads or other connecting means, and must be wired into the circuit between the canopy switch and the load with attendant increase in labor costs. Further, since in this instance the rectifier constitutes a separate and distinct wiring device, there must be space provided therefor outside of the space already occupied by the canopy switch.

The main object of the present invention is to obviate the difficulties noted above, through the provision of a self-contained, unitary switch assembly which, in a single wiring device, provides the desired dimming action while still meeting all the ordinary requirements of a conventional canopy switch in respect to mounting, assembly in the circuitry of the fixture, installation in confined areas, and relatively low initial cost.

In accomplishing the objects noted above, we have provided a dimmer switch construction which, summarized briefly, comprises a compact housing having the size, shape, and mounting means of a conventional canopy switch, including the usual casing of relatively small diameter, mounting nipple, extendible through the mounting hole conventionally provided in the lamp fixture, and the operating button projecting through the nipple.

In accordance with the invention, the housing is formed with superposed compartments for the rectifier means and the switch mechanism proper. The switch mechanism incorporates a line contact and first and second load contacts selectively connected electrically to the line contact, responsive to rotation of a three-sided rotor having a bridging element along two of its sides. This mechanism is known per se in such control switches as two-speed fan switches or the like, but in accordance with the invention, connections are provided between the rectifier means mounted in the housing, and the respective load contacts of the switch mechanism. A further connection is provided between one of the load contacts and the lamp load or other electrical device controlled by the switch. In accordance with the invention, the construction and wiring of the self-contained, unitary dimming switch assembly results in the provision of only two external wires or other circuit connectors. The device, thus, is not only mountable in the same mounting hole and area of a conventional, single-circuit canopy switch, but also is wired into the circuit of the fixture in exactly the same manner as (and hence at no greater assembly cost than) said conventional single-circuit canopy switch.

Other obects will appear from the following description, the claims appended thereto, and from the annexed drawings, in which like reference characters designate like parts throughout the several views, and wherein:

FIG. 1 is a perspective view of one form of rotary dimming switch of the canopy type, constructed according to the present invention;

FIG. 2 is an enlarged top plan view of the switch with the cover and operating button removed;

FIG. 3 is a sectional view through the switch, on the same scale as FIG. 2, taken substantially on line 3—3 of FIG. 2;

FIG. 4 is a view similar to FIG. 2, showing a modified construction;

FIG. 5 is a sectional view of the modified construction shown in FIG. 4, taken substantially on line 5—5 of FIG. 4;

FIG. 6 is a top plan view, on the same scale as FIG. 2, of another modification, with the switch mechanism, cover, operating button, and rectifier means removed;

FIG. 7 is a sectional view taken diametrically through the modification of FIG. 6, substantially on line 7—7 of FIG. 6;

FIG. 8 is a bottom plan view of the casing incorporated in the modified construction shown in FIG. 6; and FIGS. 9, 10 and 11 are schematic views showing the three different circuit conditions produced in the operation of the dimmer switch comprising the present invention.

Referring to the drawing in detail, in the form of the invention shown in FIG. 1-3, the dimmer switch comprising the invention has been generally designated 10, and includes a housing 12 which as shown is preferably of circular configuration. The construction of the invention is such that the diameter of the housing 12 does not exceed one inch, this being a size typical of ordinary canopy switches not having the dimming characteristics of the invention.

The housing 12 includes a casing generally designated 13, and formed of phenolic or other suitable electrically insulative material. In the form of the invention shown in FIGS. 1–3, casing 13 comprises lower and upper portions 14, 16 respectively, in superposed relation, having wells or chambers 18, 20 respectively for the rectifier means and the switch mechanism incorporated in the invention.

In practice, the depth of casing 13 is little more than one-half inch, comparing favorably with the corresponding dimension of a conventional canopy switch.

Within the well or chamber 20, we provide a switch mechanism generally designated 22. This includes a three-step rotor 24 stamped out of fiber or other suitable electrically insulating material. Crimped to or otherwise securely attached to the rotor 24 is a rotary bridging contact 26 of electrically conductive material, having contact surfaces 28, 30 extending along two of the three sides of the rotor. The bridging contact is of cupped formation, and includes a bottom portion centrally formed with an annulus 32 extending into a bearing recess 34 formed in a dividing wall 35 integral with the side wall of the upper casing portion 16, and constituting a separating partition between the chambers 18, 20 of the casing.

Uniformly, angularly spaced about the chamber or switch well 20 are retaining recesses for contact springs 36, 38, 40. The contact spring 40 can appropriately be termed a line contact in that it provides a connection from a 110 v. AC current supply and the switch 10. Contact spring 36 is a full power or "bright" load contact, in the sense that the electrical load is supplied with full, unrectified current when the bridging contact 26 provides a connection between the contact springs 36, 40. Contact spring 38 can be termed a reduced-power or "dimming" load contact, in that the provision of an electrical bridge between contact spring 38 and line contact spring 40 results in the shunting of the electrical power through the rectifier means and then to the load.

For the purpose of operating the switch, there is provided in the upper surface of the rotor 24, a non-circular recess 42 adapted to receive the mating inner end of an operating stem or button 44, which bears rotatably in an externally threaded nipple 46 integral or otherwise rigid with a cover plate 48 overlying and formed to substantially the same outer configuration as the casing 13. The nipple and cover plate together define a cover generally designated 49. Interposed between the cover plate and the casing is a gasket 51 of fiber or other electrical insulation. This is provided with a center opening for the inner end of the operating stem. Gasket 51 extends as insulation between the metal cover plate and the several contact springs.

The form and relative arrangement of the rotor 24, rotary bridging contact 26, contact springs 36, 38, and 40, operating stem 44, and cover 49, are conventional, per se, in control or canopy switches. Also conventional are a mounting nut and finishing nut 50, 52 respectively threaded on nipple 46. In practice, a canopy switch is mounted by disposition of the mounting nut 50 at a selected location along the length of the nipple 46. Thereafter, the nipple is extended through a smooth-walled opening A of a mounting plate B. The mounting plate B can be the base of a table or a desk lamp fixture, the wall of the canopy of a pendant ceiling fixture, or a mounting surface provided upon any of various electrical appliances, such as kitchen ranges and the like.

The rectifier means incorporated in the switch construction comprises, in the illustrated example, a solid-state diode 54. In a preferred embodiment of the invention, this is a half-wave rectifier designed to produce, in a manner well explained in Patent No. 2,896,125 issued to R. C. Morton, a reduction of the value of the load-energizing current.

In the form of the invention shown in FIGS. 1–3, a direct, permanent connection is provided between one terminal of diode 54 and the low-power contact 38, through the provision of a flexible, insulated connecting lead 58. A similar connecting lead 56 extends between and is permanently connected at its ends to the full-power contact 36 and the other terminal of the diode 54. Leads 56, 58 are looped outside casing 13 as best shown in FIG. 1, said loops being made as short as possible consistent with efficient assembly practices, so as to represent a minimum radial projection from the casing. As shown in FIG. 3, the casing is provided with radial channels or wireways 61, 63 formed in the upper and lower portions 16, 14 respectively adapted to receive and grip tightly the end portions of the respective connections.

Any suitable means can be provided for connecting the leads 56, 58 to the opposite terminals of the diode. In the illustrated example, but not necessarily, small eyelets 64, 66 receive and are crimped to the respective diode leads and the connecting leads 56, 58.

Referring to FIG. 2, channels 61 are three in number, and are uniformly, angularly spaced about the circumference of the casing. The third channel receives a lead 60 extending from a 110 v. AC source of electrical power, said lead 60 being spot-welded or otherwise fixedly connected to the line contact spring 40. Directly below lead 60, the lower casing portion 14 has a channel 63 through which extends a lead 62 adapted to extend to the load, which as above noted can be one or more ordinary single-filament incandescent lamps, or any other suitable electrical device in which it is desired to produce high and low energization levels.

Reference may now be had to FIGS. 9–11, showing the circuitry produced by operation of the assembly. The load has been designated L, and in the illustrated example it is an ordinary electric light bulb of the single-filament type. This might be provided in a table lamp, a lighting fixture hanging from the ceiling, or in any other type of fixture of appliance, and it will be understood that the invention is particularly designed for installation in the same fixture, in place of the ordinary canopy or control switch provided in such fixture.

In any event, in FIG. 9 the switch is shown in an off condition, with rotor 24 turned to a position such that contact surfaces 28, 30 are in engagement with the load contacts 38, 36 respectively. Accordingly, this produces a complete break in the electrical connection between the line contact and the load L, so that the load is deenergized.

On rotation of the rotor through 120°, from its off position in a clockwise direction viewing the same as in FIG. 2, contact surfaces 28, 30 will be in engagement with line contact spring 40 and low-power contact 38, respectively. As shown in FIG. 10, power now flows through the rectifier 54, before reaching the load, and after passing through the load to energize the same at its lower energization value, returns to the source of power through a lead 67. Leads 60, 67, as will be understood, can merge into the respective conductors of a conventional convenience cord having the usual attachment plug cap 69 connectable to an ordinary duplex receptacle, not shown, located in the 110 v. AC supply circuit.

Referring now to FIG. 11, further rotation of the rotor will now bring the contact surfaces 28, 30 into engagement with the contact springs 36, 40 respectively. As a result, the rectifier 54 is bypassed, so that current flows at full power through the load.

It will be noted that with lead 58 connected to one terminal of the diode 54 by means of the crimped eyelet 64, the lead 56, and also the lead 62, are both crimped to the other terminal of the diode. Thus, when the parts are in their FIG. 10 position, current flows through the diode and passes to the load through the lead 62. In the FIG.

11 circuit condition (shown also in FIG. 2), the current passes directly from the contact spring 36, through lead 56, to the connecting eyelet 66, and then to the load through lead 62 which is also connected to the eyelet 66.

Assembly of the switch is provided through the provision of uniformly, angularly spaced openings 68 provided in the cover plate, registering with similar openings formed in the upper and lower portions of the casing to receive rivets 70 or equivalent fastening elements.

Referring to FIGS. 4 and 5, a modified construction generally designated 72 is here shown. This construction eliminates the need for the looped connecting leads 56, 58. In this construction, housing 74 includes a lower portion 76, and an upper portion 78, provided with diode and switch mechanism compartments or chambers 80, 82 respectively separated by a dividing wall 84 constituting an integral part of the upper casing portion 78.

In the modified construction, the switch mechanism includes the rotor 24 and rotary bridging contacts 26, having contact surfaces 28, 30, as in the first form of the invention. Further, there is provided a line contact spring 40, together with its associated lead 60, as in the first form of the invention.

In this form, however, we provide depending, integral extensions on the respective load contacts, extending downwardly through openings formed in the divider wall 84, and connected within the diode compartment 80, to the respective ends of the diode. To this end, there is provided a high power load contact 88, to which lead 62 is fixedly secured.

A low-power or dimming contact spring 86 is also provided, said contact springs 86, 88 being formed identically to the corresponding springs 36, 38 of the first form of the invention.

Integral with and depending from the contact springs 86, 88, however, are straight extensions 90 projecting downwardly through openings 92 formed in divider 84 directly below the retained or anchored portions of the contact springs 86, 88. Within the diode compartment, the depending extensions 90 are secured to the respective terminal leads of diode 54, to provide electrical connections between the diode terminals and the contact springs 86, 88 in the same relationship as the connecting leads 56, 58 bear to the load contact springs and the diode terminals in the first form of the invention.

In this form of the invention, leads 60, 62 are angularly spaced about the circumference of the housing, rather than being in registration as in the first form of the invention. Functionally, however, the modified construction shown in FIGS. 4 and 5 is identical to the first form. Thus, when the parts are arranged as in FIG. 4, the FIG. 11 circuit condition prevails, with a direct connection being provided between line contact 40 and high-power load contact 88 through the bridging contact. Turning of the rotor clockwise in FIG. 4, to its next position, will move the blank side of the rotor into engagement with the line contact, to provide the circuit condition shown in FIG. 9. Advancement of the rotor one step from the off position then brings the bridging contact into engagement with the contact springs 40, 86, to require current flow through the diode. It will be understood that in these circumstances, the current, flowing from contact spring 86 to the diode, flows through the diode to the depending extension, not shown, of contact spring 88 and then to the load through lead 62.

In FIGS. 6–8, another modification is shown, which eliminates not only the looped leads 56, 58, but also, simplifies manufacture and assembly through the provision of a one-piece casing body. In this form of the invention, the casing 96 has its lower and upper portions 98, 100 integral with one another. The diode and switch chambers 102, 104 respectively are in superposed relation as in the other forms of the invention, in the integrally joined lower and upper portions 98, 100 of the casing 96.

The lower portion 98, as shown in FIG. 8, is of approximately isosceles-triangular configuration, and is reduced in area considerably with respect to the diameter of the upper portion 100, so as to in effect define a flange 105 formed with rivet holes 106. The arrangement permits the use of shorter rivets than are required by the other forms of the invention, and has the further advantage that the necessity of registering rivet holes of the upper and lower casing portions is eliminated. Further, the lower casing portion is of reduced area, so that the switch occupies even less space than is required by the other forms of the invention.

It will be understood that in FIGS. 6–8, all components of the switch mechanism, as well as the diode, have been omitted from the drawing, since the modification resides entirely in the casing construction. In this form of the invention, the cover 49, rotor 24, bridging element, operating button or stem 44, and diode, would all be as in the first form of the invention. Further, the contact springs would be those provided in the form of the invention shown in FIGS. 4 and 5.

In this form of the invention, there are uniformly, angularly spaced contact spring recesses 108, 110, 112. Recesses 110, 112 are in communication with radial channels or wireways 114, 116 respectively, adapted to receive leads 60, 62 respectively. Thus, line contact spring 40 would be disposed in recess 110, high-power contact spring 80 would be disposed in recess 112, and low-power contact spring 86 would be in recess 108.

In this form of the invention, the divider wall 118 comprises a flat, generally circular plate member molded of phenolic material. It will be understood that any other suitable material of electrically insulative qualities can be employed, and one might thus form the divider wall as a stamped fiber piece should this be found more economical. In any event, the divider wall serves the same function as the corresponding walls of the first two forms of the invention.

The divider wall 118 is dropped into place, in the switch chamber 104, and as shown in FIG. 6, has a bearing recess 120 adapted to receive the annulus 32 of the rotary bridging contact. In the illustrated example, the dividing wall is supported upon ledges 122 comprising the upper surfaces of the respective, triangularly arranged walls of the lower casing portion 98. Flat surfaces 124 integrally formed upon said ledges are in confronting relation to corresponding flat surfaces 126 of the dividing wall. This arrangement provides maximum support area for the dividing wall, and has the incidental effect of holding the dividing wall against rotatable movement.

The divider of the dividing wall is such as to cause the corner areas of the triangular diode chamber 102 to be in communication with the contact spring recesses 108, 110, 112, thus defining openings 128 corresponding to the openings 92 shown in FIG. 4. The depending extensions 90 of the load contact springs 86, 88 extend downwardly through said openings 128, as will be understood, and would be connected to the diode 54 in the same manner as shown in FIGS. 4 and 5. In fact, the modified form of FIGS. 6–8 is identical to the form shown in FIGS. 4 and 5, with respect to the switch mechanism, connections between said mechanism and the diode, and the connections and arrangement of the leads 60, 62 as regards said switch mechanism.

All forms of the invention have the desirable characteristics of providing, in a self-contained, unitary switch assembly, a dimming device that takes up little or no more space within an electrical fixture, than is occupied by the conventional canopy or control switch provided in said fixture. Further, the device is mountable in such fixture in the same manner as a conventional canopy switch, so that it requires no modification whatever of the fixture. A manufacturer of lamp fixtures can, thus, make the components of all his fixtures identical, and can wire some with dimming switches and others with conventional canopy switches, without modifying the basic fixture construction. Further, the dimmer switch of the invention, having only two leads extending therefrom, is wired into the fixture identically to a conventional canopy switch, which typically (in a single circuit switch) also has only two leads extending therefrom. These, coupled with the comparatively low cost of the dimmer switch itself, constitute important advantages in the highly competitive field in which the switch would be used.

It should be noted that although the circuitry illustrated and described has an operating sequence of "off-low-high," this sequence is merely exemplary. The construction is by no means limited to such sequence, since obviously, the positions of the low and high-power contact springs can be reversed in each of the several embodiments of the invention. In fact, in a commercial embodiment it would probably be desirable to use an "off-high-low" sequence, except where the sequence illustrated and described herein is specially ordered by a customer. In dimmer switches utilizing solid-state diodes as rectifiers, it is desirable to go from the off position, through the "bright" or high position, to the "dim" or low position. This is desirable because when a conventional tungsten lamp is energized after it has been off even for a short period of time, there is an initial current surge of a value of approximately ten times the normal flow of current. If this initial surge is put through the diode, every time the switch is operated from its off position, the life of the diode may be shortened.

If, however, it is impossible to go to the dimming position except through the high position, the initial current surge does not pass through the diode, thus indicating the probable desirability of an "off-high-low" operating sequence.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

We claim:
1. In a canopy-type switch the combination, with a housing having a rotor well, a rotor mounted in said well for rotation and having a bridging element, a line contact and two load contacts uniformly angularly spaced about said well in the plane of the rotor and disposed for bridging of two of said contacts in each position to which the rotor is turned, the line contact having a connection to a current source, of dimmer means comprising:
   (a) electrical connecting elements extending to one side of said plane from the respective load contacts to an adjacent plane paralleling the plane of the rotor;
   (b) a two-electrode rectifier lying in said adjacent plane and having one electrode connected to one of said connecting elements; and
   (c) a connection to load extending exteriorly of the housing, said other connecting element and the other electrode of the rectifier having a common connection to said load connection.

2. In a canopy-type switch, the combination of claim 1, wherein said connecting elements are wire loops extending between said planes of the rotor and rectifier respectively.

3. In a canopy-type switch the combination of claim 1, wherein said connecting elements are metal strips extending between said planes of the rotor and rectifier respectively.

References Cited

UNITED STATES PATENTS 3,215,891 11/1965 Fritz et al. _____ 307—146
Re. 26,119 12/1966 Slater _____ 307—146

ROBERT K. SCHAEFER, *Primary Examiner.*

H. BURKS, *Assistant Examiner.*